United States Patent [19]

Hartsock

[11] Patent Number: 4,649,806

[45] Date of Patent: Mar. 17, 1987

[54] COMPOSITE CERAMIC/METAL PISTON ASSEMBLY AND METHOD OF MAKING

[75] Inventor: Dale L. Hartsock, Livonia, Mich.

[73] Assignee: Ford Motor Company, Dearborn, Mich.

[21] Appl. No.: 719,858

[22] Filed: Apr. 4, 1985

[51] Int. Cl.⁴ .................................................. F16J 1/01

[52] U.S. Cl. ........................................ 92/212; 92/213; 92/224; 92/248; 123/669; 123/193 P

[58] Field of Search ................. 92/212, 213, 219, 222, 92/224, 248; 123/193 P, 668, 669

[56] References Cited

U.S. PATENT DOCUMENTS

| | | | |
|---|---|---|---|
| 3,075,817 | 1/1963 | Mayes | 92/213 |
| 4,306,489 | 12/1981 | Driver et al. | 123/193 P |
| 4,404,935 | 9/1983 | Kraft | 123/193 P |
| 4,419,925 | 12/1983 | Tsuzuki et al. | 92/212 |
| 4,506,593 | 3/1985 | Sugiyama et al. | 92/224 |
| 4,524,498 | 6/1985 | Hartsock | 92/213 |
| 4,530,341 | 7/1985 | Palm | 123/193 P |
| 4,535,683 | 8/1985 | Dworak et al. | 92/224 |

*Primary Examiner*—Ira S. Lazarus

*Attorney, Agent, or Firm*—Joseph W. Malleck; Roger L. May

[57] ABSTRACT

An integrally cast composite piston assembly is disclosed which is effective to carry a ceramic plate in an iron based cap. The assembly comprises a cylindrical piston body, preferably of aluminum, having a crown top, an annular crown side wall with an upper edge, and an annular undercut surface terminating the crown side wall. The undercut surface must make an angle with a plane extending perpendicular to the axis of the piston, the angle being substantially equal to the arc tangent of H/R where H is the median distance of the undercut surface from the plane and R is the median radius of the undercut surface from the axis of the piston. The assembly further comprises the cylindrical iron-based cap disposed on the piston body crown top and having a cap side wall depending about the crown side wall, the cap side wall having an annular lip extending radially inwardly from the cap side wall, the lip having a surface mateable with the undercut surface of the piston body so that there exists a tightly stressed camming relationship between the mateable surfaces as a result of the shrinkage of the piston body upon solidification.

6 Claims, 2 Drawing Figures

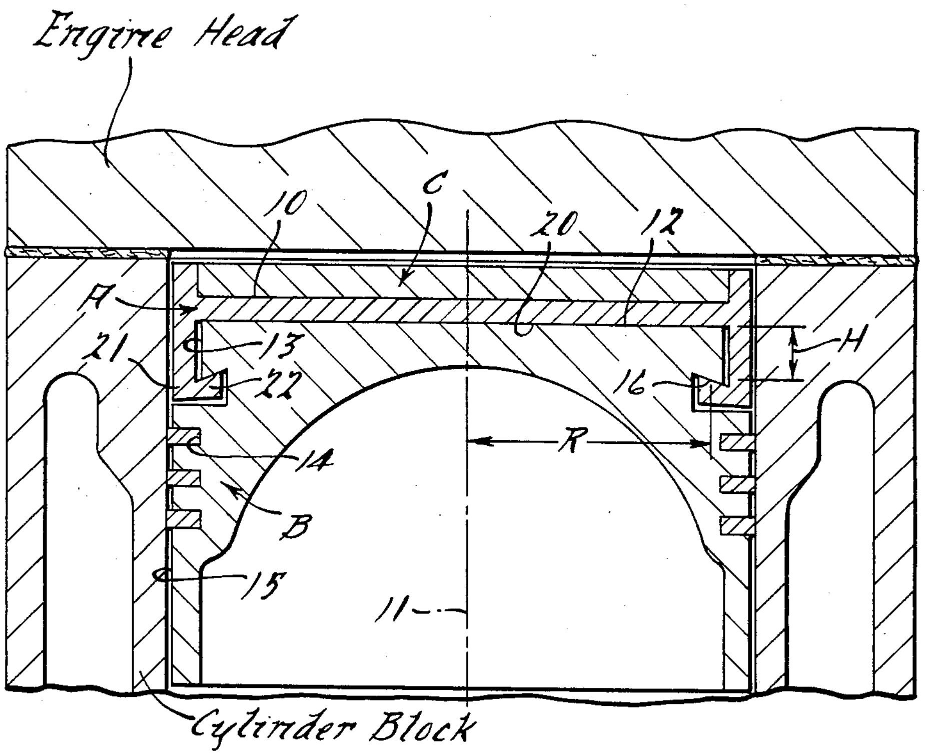
FIG. 1.
FIG. 2.
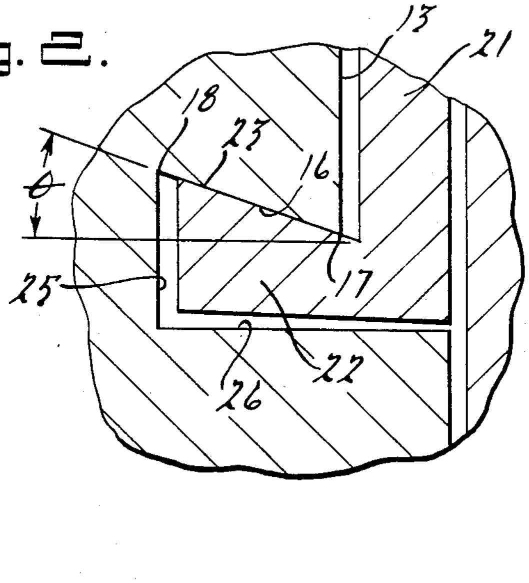

COMPOSITE CERAMIC/METAL PISTON ASSEMBLY AND METHOD OF MAKING

TECHNICAL FIELD

The invention relates to lightweight metal piston constructions and, more particularly, to the technology of attaching ceramic components to the lightweight metal piston body.

BACKGROUND OF THE INVENTION AND PRIOR ART STATEMENT

With the advent of the adiabatic diesel engine, there has arisen a need for operating an internal combustion engine at higher temperatures without significant loss of heat to an engine cooling system. Ceramics have been suggested for use to implement these ideas. Nowhere is the need for ceramics more important than in the use of an aluminum piston. Several approaches have been used by the prior art to apply ceramics to current production pistons. Mechanical assemblage of a ceramic cap to the piston has been proposed: see U.S. Pat. No. 4,404,935, utilizing a spring biased interlocking shoulder; see U.S. Pat. Nos. 2,257,236, 1,743,323, for securing the ceramic cap to the piston skirt by matching grooves; and see U.S. Pat. No. 1,357,851, for securing such cap by use of threads. Each of these mechanical means may ultimately result in mechanical failure of the ceramic cap due to pressure sensitivity of the brittle ceramic and/or the thermal expansion differential between the ceramic and the supporting metal. In addition, each of these means have their own distinct disadvantage, for example, the spring biased assembly suffers from poor pressure sealing for engine operation.

Ceramics have also been applied to a metallic piston by spray-on techniques (see U.S. Pat. No. 2,833,264), or sintering of the ceramic to the piston metal (see U.S. Pat. No. 2,657,961). These approaches have failed because thick coatings crack due to high thermal gradients and differential thermal expansion, and thin coatings do not provide a sufficient amount of insulation to be worthwhile.

A significantly new approach is to support a preformed ceramic member in a ferrous metal cap or ring which in turn is attached to the aluminum piston body. The ferrous metal cap or ring is sufficiently close in thermal expansion to some ceramics, such as partially stabilized zirconia, to eliminate cracking due to differential thermal expansion. However, there still remains a thermal expansion difference between the ferrous cap and the aluminum piston, which problem must be remedied.

It is not sufficient in solving the latter problem to reverse the use of the materials by making the cap of aluminum and the piston of cast iron. Such reversal of material by various means has been suggested by the prior art. For example, in U.S. Pat. No. 1,771,771, the cap was cast in place with the piston body utilizing double interlocking surfaces which did not totally eliminate rotary looseness; in U.S. Pat. No. 1,388,552, the aluminum cap was tied to the cast iron body by pins, which approach could not realize weight economics and promoted cracking of the ceramic due to the rigidity of the connection. In U.S. Pat. No. 4,364,159, an iron ring was shrunk fit onto an aluminum piston, which ring is incapable of supporting a ceramic insert.

Efforts have been made to cast in place a nonferrous ring with an aluminum piston as disclosed in U.S. Pat. No. 3,152,523, utilizing a titanium cap, and in U.S. Pat. No. 4,334,507, utilizing a nickel-copper or chrome-nickel powder cap. Each of these patents achieves some degree of interlock. In the '507 patent, this was accomplished by filling the pores of the powder with the aluminum melt; this presents a problem because it does not accommodate differential thermal expansion problems. In the '523 patent, a key-shaped interlock was employed; again the problem associated with differential thermal expansion is not addressed, and residual stresses in the aluminum can lead to failure of the piston.

It would be desirable if a method could be devised for securing a ferrous ring (which is capable of supporting a ceramic cap) to an aluminum piston to achieve tight, concentric interengagement between two dissimilar material cylinders at all operating temperatures of the engine and which secure engagement can be achieved economically and with elementary parts.

SUMMARY OF THE INVENTION

The invention is an integrally cast composite assembly of a cylinder cap attached to a piston having a higher thermal expansion characteristic than the cylinder cap, and a method of producing such composite assembly.

The composite assembly comprises: (a) a piston body comprised substantially of a body of revolution and of a material having a higher thermal expansion characteristic than the cylinder cap, the piston body having a crown top and an annular crown side wall with an upper edge, and an annular undercut surface terminating the crown side wall, the undercut surface making an angle with a plane extending perpendicular to the axis of the piston, the angle being substantially equal to the arc tangent of H/R where H is the median distance of the undercut surface from said plane and R is the median radius of the undercut surface from the axis of the piston; (b) a cylindrical cap disposed on the piston body crown top and having a cap side wall depending about the crown side wall, the cap side wall having an annular lip extending radially inwardly from the cap side wall, the lip having a surface mateable with the undercut surface of the piston body so that there exists a tightly stressed camming relationship between the mateable surfaces as a result of the shrinkage of the piston body upon solidification.

Preferably, the piston body has the undercut surface extending upwardly toward the piston crown top as the undercut surface proceeds radially inwardly.

The undercut surface preferably has its radially outer periphery more remote from the piston crown top than its radially innermost periphery.

Preferably, the piston body is comprised of aluminum and the cap is comprised of ferrous based material.

The method of this invention contemplates attaching a metallic, cylindrical cap to a metallic piston cylinder of revolution having a higher thermal expansion characteristic than the metal of the cap. The method comprises: (a) inserting a preformed cylindrical cap in a mold in a manner to define the crown top and adjacent annular crown side wall of the piston cylinder, the cap having a depending side wall with a radially inwardly extending lip defining the termination of the crown side wall of the piston cylinder, the lip has an under-surface facing the crown top and crown side wall, the under-surface is disposed at an angle with respect to the crown top of the piston, such angle being substantially equal to the arc tangent H/R where H is the median distance of the lip under-surface from the piston crown top and R is the median radius of the lip surface from the axis of the piston; (b) pouring a melt of the higher thermal expansion metal for the piston cylinder into the mold and allowing such melt to solidify with the under-surface forming a mating under-surface on the cylindrical piston, and during which solidification the piston cylinder will shrink away from the cylindrical cap side wall to bring the mating under-surface surfaces tightly into stressed camming relationship with each other, creating a tight mechanical bond between the cap and piston.

BRIEF DESCRIPTION OF DRAWINGS

FIG. 1 is a central sectional elevational view of the piston and cylinder construction embodying the principles of this invention; and FIG. 2 is an enlarged fragmentary view of a portion of FIG. 1.

DETAILED DESCRIPTION

As shown in FIG. 1, the integrally cast composite assembly is a piston comprising essentially a metallic cylindrical cap A attached to a metallic piston body or cylinder B, the piston body having a higher thermal expansion characteristic than the material of the cap. The cap in turn is defined to have a seat 10 for receiving a ceramic insert or plate C (such as partially stabilized zirconia) which is useful in promoting a high thermal resistance characteristic.

The piston body B is a cylindrical body of revolution about an axis 11, except for the wrist pin openings, and is comprised of aluminum or an aluminum alloy, such as SAE 34, having a higher thermal expansion characteristic than the metallic cap cylinder, the latter being preferably comprised of an iron based material, such as 400 series stainless steel. The piston body B has a crown top 12 which is substantially flat and is substantially perpendicular to the axis of the piston. The piston body also has an annular crown side wall 13 which extends downwardly to a region just short of a series of annular grooves 14 (defined in the piston skirt wall 15 for receiving metallic piston rings). The hottest zone to which the piston is subjected is usually opposite the ceramic plate C.

The piston body additionally has an undercut surface 16 which defines the termination of the crown side wall 13 at lower edge 17. The undercut annular surface 16 has an annular radially outer periphery defined by edge 17 which is spaced a greater distance from the piston crown top than the radially inner periphery 18 of such undercut surface; the annular undercut surface 16 is biased upwardly as it proceeds radially inwardly of the piston body. The undercut surface is disposed at an angle theta which is selected to be substantially equal to the arc tangent of H/R where H is the median distance of the undercut surface from the piston crown top surface and R is the median radial distance of the undercut surface from the axis 11 of the piston.

Cap A is disposed so that flat bottom surface 20 fits snugly on the piston crown top 12. The cap has an annular depending side wall 21 with an annular inwardly extending lip 22. The lip 22 has an under-surface 23 facing upwardly in the direction of the piston crown top and is adapted to mate with the undercut surface 16 of the piston body. The mateable biased surfaces 16 and 23 are brought tightly into a stressed camming relationship by virtue of the shrinkage of the aluminum piston body upon solidification from the preformed cap in place. Such shrinkage moves the crown side wall 13 and undercut surface 16 radially inward to wedge tightly against the under-surface 23 of lip 22. Since the under-surface 23 of the preformed cap defines the undercut surface 16 of the piston body during casting, the angle of the under-surface 23 with the crown top surface must also be substantially the arc tangent of H/R as previously described.

The method of attaching such integrated composite assembly is as follows. First, inserting the previously defined and shaped steel cap in a mold in a manner so that it will define the crown top 12 and adjacent annular crown side wall 13 (with undercut surface 16) of the piston body. To do this, the cap has a flat bottom 20, an annular depending wall 21 with a radially inwardly extending lip 22 having an under-surface 23 facing upwardly against the piston crown top. The lip defines the termination of the crown side wall 13 of the body. The lip has under-surface 23 facing in a manner so that it is disposed at an angle theta with respect to the piston crown top 12, theta being substantially equal to the arc tangent of H/R where H is the median distance of the under-surface from crown top and R is the median radial distance of the under-surface from the axis 11. The mold will define all surfaces of the piston other than the crown top 12, crown side wall 13, undercut surface 16, and annular shoulder surfaces 25 and 26.

Secondly, an aluminum melt, for the metal of the piston body, is poured into the mold and allowed to solidify. During solidification, the aluminum metal will shrink away from the steel ring cap, placing a stressed camming relationship on the two mating biased surfaces 16 and 23 as the crown side wall portion tends to draw radially inwardly, wedging and camming the surfaces together more tightly.

A release agent may be coated on the steel cap, prior to casting, to insure that the two surfaces 16 and 23 can slide with respect to each other upon solidification.

If the angle $\theta$ exceeds the arc tangent of H/R, then yielding will occur and be disadvantageous because high residual stresses may occur at 18 leading to failure of the piston. If the angle $\theta=$ is substantially less than the arc tangent of H/R, then loss of contact at 16 will occur and be disadvantageous because the cap A will no longer be held tightly to piston body B.

I claim:

1. An integrally cast composite assembly of a cylindrical cap attached to a piston having a higher thermal expansion characteristic than the cylindrical cap, said cap being adapted to receive a ceramic insert, comprising:

(a) a piston body comprised substantially as a body of revolution about an axis and comprised of a material having a higher thermal expansion characteristic than said cylindrical cap, the piston body having a crown top and an annular crown side wall with an upper edge, and an annular undercut surface terminating the crown side wall, said undercut surface making an angle with a plane extending perpendicular to said axis and passing through the upper edge of said crown side wall, said angle being substantially equal to the arc tangent of H/R where H is the median distance of the undercut surface from said plane and R is the median radius of the undercut surface from the axis of the piston;

(b) a cylindrical cap disposed on said piston crown top and having a cap side wall depending about the crown side wall, said cap side wall having an annular lip extending radially inwardly from the cap side wall, said lip having a surface mateable with said undercut surface of said piston body so that there exists a tightly stressed camming relationship between said mateable surfaces as a result of the shrinkage of the piston body upon solidification.

2. The composite assembly as in claim 1, in which said piston body has said undercut surface extending upwardly toward the piston crown top as the undercut surface proceeds radially inwardly.

3. The composite assembly as in claim 1, in which said undercut surface has a radially outer periphery located more remote from the piston crown top than its radially innermost periphery.

4. The composite assembly as in claim 1, in which said piston body is comprised of aluminum and said cap is comprised of an iron based material.

5. A method of attaching a metallic cylindrical cap to a metallic piston cylinder of revolution having a higher thermal expansion characteristic than the metal of said cap, said cap being adapted to receive a ceramic insert, comprising:

(a) inserting a preformed cylindrical cap in a mold in a manner to define the crown top and adjacent annular crown side wall of the piston cylinder, said cap having a depending side wall with a radially inwardly extending lip defining the termination of the crown side wall, the lip having an under-surface facing said crown top and crown side wall, said under-surface is disposed at an angle with respect to the crown top of the piston, said angle being substantially equal to the arc tangent of H/R where H is the median distance of the lip under-surface from the piston crown top and R is the median radius of the lip surface from the axis of the piston;

(b) pouring into said mold a melt of said higher thermal expansion metal for said piston cylinder and allowing said melt to solidify with said under-surface forming a mating under-surface for said cylindrical piston, and during which solidification said piston cylinder shrinks away from said cylindrical cap side wall to bring the under-surface and mating surface tightly into stressed relationship with each other, creating a tight mechanical bond between said cap and piston.

6. The method as in claim 5, in which said cap is comprised of steel and said melt is comprised of aluminum.

* * * * *